(No Model.)  2 Sheets—Sheet 1.

T. CRANEY.
PROCESS OF PURIFYING WATER.

No. 524,887. Patented Aug. 21, 1894.

Witnesses:
O. F. Barthel
L. J. Whittemore

Inventor:
Thomas Craney,
By [signature]
Attorneys.

(No Model.) 2 Sheets—Sheet 2.

T. CRANEY.
PROCESS OF PURIFYING WATER.

No. 524,887. Patented Aug. 21, 1894.

Witnesses:
O. F. Barthet.
L. J. Whittemore

Inventor:
Thomas Craney,
By
Attorneys.

UNITED STATES PATENT OFFICE.

THOMAS CRANEY, OF BAY CITY, MICHIGAN.

PROCESS OF PURIFYING WATER.

SPECIFICATION forming part of Letters Patent No. 524,887, dated August 21, 1894.

Application filed June 19, 1893. Serial No. 478,185. (No specimens.)

*To all whom it may concern:*

Be it known that I, THOMAS CRANEY, a citizen of the United States, residing at Bay City, in the county of Bay and State of Michigan, have invented certain new and useful Improvements in Processes of Purifying Water, of which the following is a specification, reference being had therein to the accompanying drawings.

The invention consists in the novel steps employed in purifying water from its solid and gaseous impurities, all as more fully hereinafter described.

Figure 1:
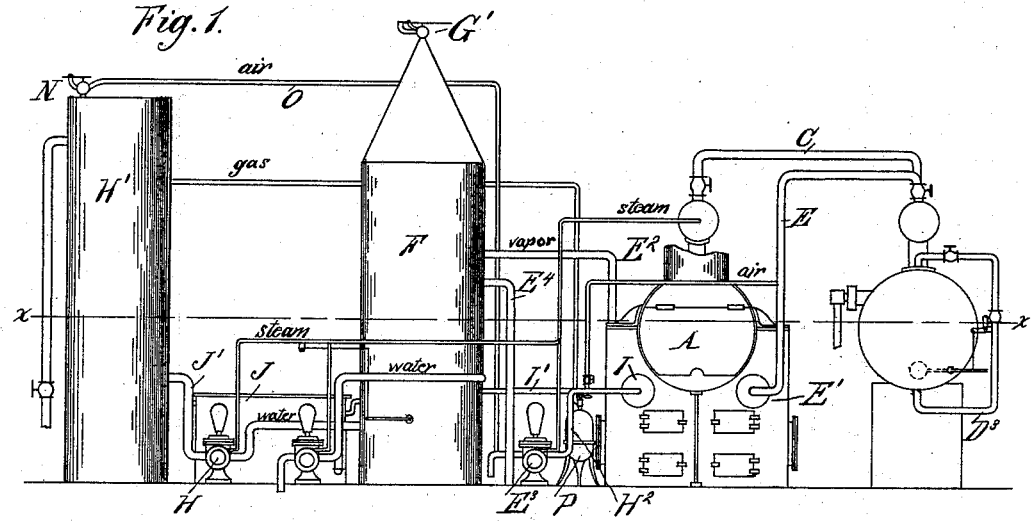
Figure 2:
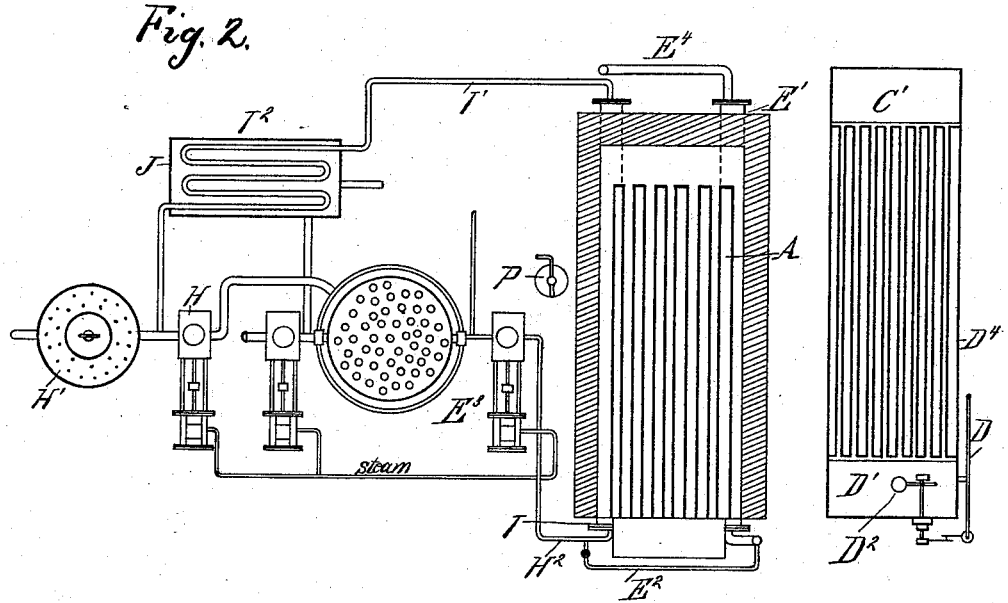
Figure 4:
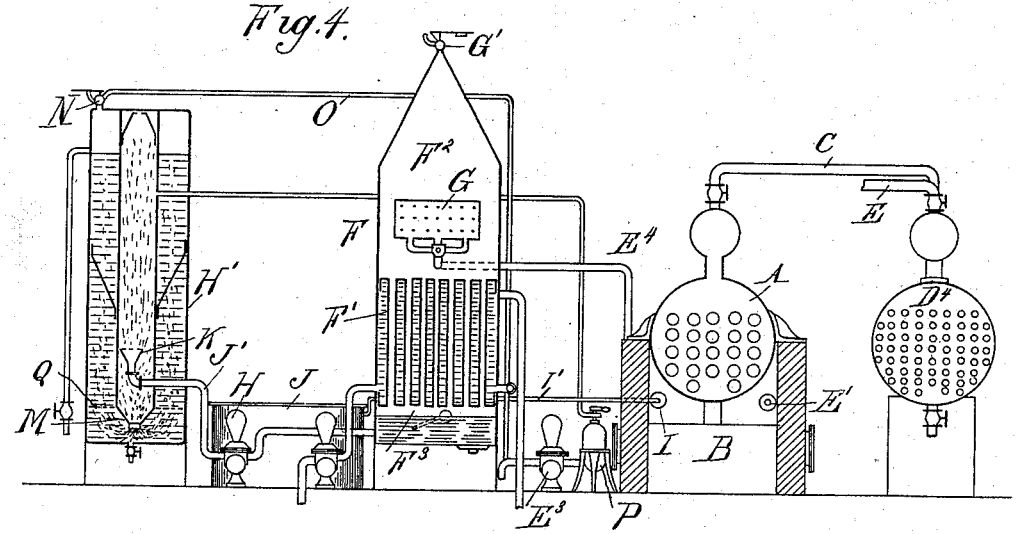
Figure 3:
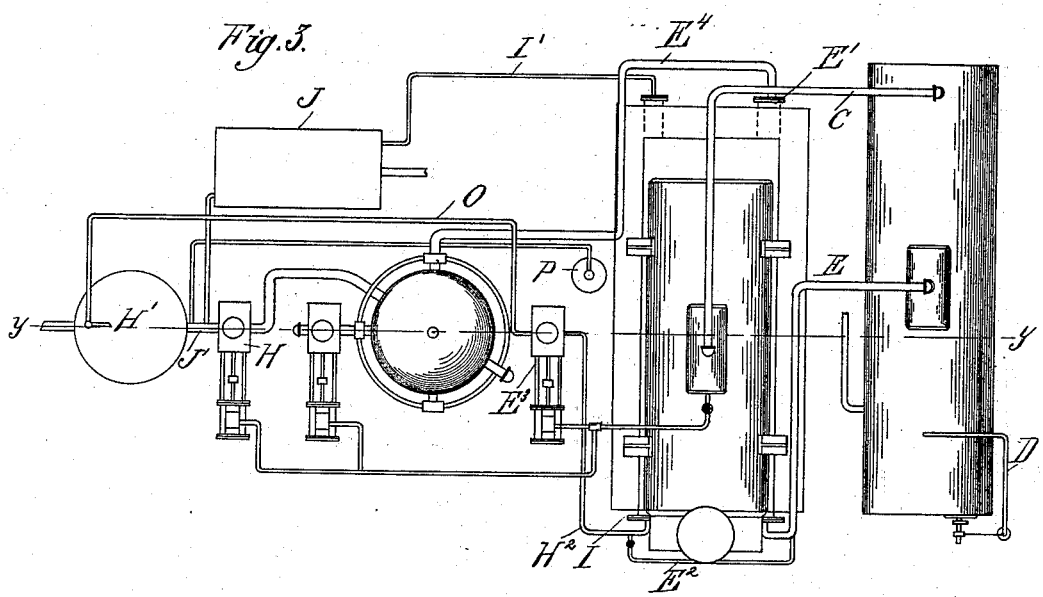

In the drawings, Figure 1 is a side elevation of an apparatus designed to carry out my process. Fig. 2 is a horizontal section thereof on line $x\ x$. Fig. 3 is a top plan view thereof, and Fig. 4 is a vertical section on line $y\ y$.

My process is intended especially for the purification of water for drinking purposes and is especially adapted for the handling of large quantities thereof, and is adapted to convert the foulest swamp water into satisfactory drinking water.

I have shown in this application and described the method and the apparatus necessary for carbonating the purified water. I do not herein claim such carbonating process but intend to make that the subject matter of a separate application.

A is the steam generator. B is the furnace chamber thereof.

C is the steam pipe extending from the steam dome of the generator and entering a chamber C' at one end of the still, this chamber communicating through the flues with the chamber D' at the other end.

$D^2$ is a float valve controlling the exit pipe $D^3$.

$D^4$ is a chamber surrounding the flues and which in starting is filled with cold water for condensing the steam passing through the flues. The supply to this chamber is continued by the water of condensation collecting in the chamber D' which passes out through the exit pipe $D^3$ which connects into the top of the chamber $D^4$. The water in the chamber $D^4$ will be heated and steam will be generated therein which will pass into the steam dome and thence through the pipe E through the super-heated chamber E' in the furnace B. Before entering the superheating chamber, I commingle with the steam a suitable amount of air which is supplied through the pipe $E^2$ from the air pump $E^3$. The object in passing the commingled steam and air through the super-heater is two-fold: First—to superheat the steam to a high temperature and second, to sterilize the air which commingles therewith and heat the same. If desired, however, the air may be heated in the separating chamber and commingle with the super-heated steam in the pipe $E^4$ which leads from the superheater E'. The superheated air and steam thus commingled is next led to the condenser F which is provided with the condensing chamber F', the gas chamber $F^2$ at the top and the settling or water chamber $F^3$ at the bottom. The commingled air and steam enters into a perforated drum G preferably arranged with lateral apertures only, so that the air and steam are distributed evenly throughout the upper chamber of the condenser and without any jet effect. The steam vapor being heavier than the air and the lighter gases such as ammonia, &c., with which the water may have been originally charged will descend into the condenser F' and be condensed therein, the fluid accumulating in the chamber $F^3$ while the super-heated air with the lighter gases will ascend to the gas chamber $F^2$ at the top and as the pressure increases will open the weighted valve G' at the top of the gas chamber and escape.

The water thus far has been subjected to a double distillation and freed from its gaseous impurities. Now to make it fit for drinking purposes it is necessary that it should be thoroughly aerated and if desired carbonated.

H is a pump for taking the water from the chamber $F^3$ and discharging it into the tank H'. The air which is to be used in aerating should be thoroughly sterilized and to that end I preferably arrange a pipe $H^2$ from the air pump $E^3$ which connects with a superheating chamber I in the furnace.

I' is the exit pipe from the superheating chamber which I preferably pass in a suitable coil $I^2$ through a water tank J to cool the air and at the same time to heat the water which is fed to the boiler, the tank $J^5$ acting as the feed tank for the boiler, a suitable pump being employed to feed the water therein.

The air under pressure is admitted into the discharge pipe J from the pump H and commingles with the fluid therein. This discharge pipe terminates in a finely perforated nozzle K or other spraying device, which discharges into the inner chamber L of the tank H'. The fluid being divided into the finest particles by this spraying effect is thoroughly aerated and a further aeration is effected by arranging the exit from the chamber L through a contracted nozzle M at the bottom, so that as the vapor in condensing falls to the bottom and the air pressure forces it out through the nozzle M at the bottom of the tank H', the air will necessarily pass through the entire body of water in that tank to rise to the top thereof where it will find exit in the pressure relief valve N. The exit from this pressure relief valve I preferably connect by means of the pipe O with the section of the pump $E^3$, so that this sterilized air which is not taken up by the water may be used over again.

If it is desired to carbonate the water it may be done by discharging the carbonic acid gas into the tank H', or I preferably connect the suction of the pump E with the tank P containing carbonic acid gas, so that the gas and air together enter the pipe J and are discharged into the chamber L under pressure.

In using the carbonating process it is evident that the return connection O to the pump $E^3$ is especially beneficial as such carbonic acid gas as is not taken up by the water is returned and so used over again.

Near the bottom of the tank H, I preferably arrange a perforated diaphragm Q which assists in breaking up the air in small globules to aid in its aerating effect.

I do not claim the apparatus for carrying out my process of purifying water as I have made that the subject of a concurrently filed application, nor do I desire to be limited to the particular kind of apparatus shown and described for carrying out my process.

I claim—

1. The herein described method of purifying water consisting in transforming the water into steam, conducting the steam into a suitable still, condensing the steam in the still, generating steam from the water of condensation, introducing a volume of air into the steam, conducting the commingled air and steam into a suitable heater, and finally condensing the steam, substantially as described.

2. The herein described method of purifying water consisting in generating steam, condensing said steam, redistilling the water of condensation introducing a volume of air into the distilled product, superheating the commingled air and steam, and injecting the superheated air and steam through a suitable jet into a condenser and condensing the steam, substantially as described.

In testimony whereof I affix my signature in presence of two witnesses.

THOMAS CRANEY.

Witnesses:
JAMES WHITTEMORE,
M. B. O'DOGHERTY.